United States Patent
Lee et al.

(10) Patent No.: US 9,666,886 B2
(45) Date of Patent: May 30, 2017

(54) CONDENSED WATER REMOVING METHOD AND APPARATUS OF GAS DIFFIUSION LAYER AND CATALYST LAYER OF FUEL CELL AND APPARATUS

(71) Applicant: Hyundai Motor Company, Seoul (KR)

(72) Inventors: Nam Woo Lee, Hwaseong Gyeonggi-do (KR); Sang Uk Kwon, Suwon Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/567,494

(22) Filed: Dec. 11, 2014

(65) Prior Publication Data

US 2015/0188163 A1 Jul. 2, 2015

(30) Foreign Application Priority Data

Dec. 31, 2013 (KR) .................. 10-2013-0168516

(51) Int. Cl.

| | |
|---|---|
| *H01M 8/04119* | (2016.01) |
| *H01M 8/0432* | (2016.01) |
| *H01M 8/04492* | (2016.01) |
| *H01M 8/2465* | (2016.01) |
| *H01M 8/04746* | (2016.01) |
| *H01M 8/04007* | (2016.01) |
| *H01M 8/04089* | (2016.01) |

(52) U.S. Cl.
CPC ....... *H01M 8/04156* (2013.01); *H01M 8/045* (2013.01); *H01M 8/0432* (2013.01); *H01M 8/04335* (2013.01); *H01M 8/04358* (2013.01); *H01M 8/04753* (2013.01); *H01M 8/2465* (2013.01); *H01M 8/04067* (2013.01); *H01M 8/04089* (2013.01); *H01M 2250/20* (2013.01)

(58) Field of Classification Search
None
See application file for complete search history.

(56) References Cited

U.S. PATENT DOCUMENTS 8,728,641 B2 * 5/2014 Kagami ............ H01M 8/04104
429/429

FOREIGN PATENT DOCUMENTS

| JP | 2002-324563 A | 11/2002 |
|---|---|---|
| JP | 2003-317753 | 11/2003 |
| JP | 2004-030979 A | 1/2004 |

(Continued)

*Primary Examiner* — Ula C Ruddock
*Assistant Examiner* — Thomas Parsons
(74) *Attorney, Agent, or Firm* — Mintz Levin Cohn Ferris Glovsky and Popeo, P.C.; Peter F. Corless

(57) ABSTRACT

Disclosed are a method and an apparatus for removing condensed water in a gas diffusion layer and a catalyst layer of a fuel cell. The method comprises steps of: a step of determining whether the condensed water is generated in the gas diffusion layer and the catalyst layer of the fuel cell; a step of reducing and supplying an amount of air supplied to a cathode of the fuel cell at a predetermined level, when it is determined that the condensed water is generated in the gas diffusion layer and the catalyst layer in the step of determining; a step of measuring a temperature of a stack of the fuel cell; and a step of increasing the amount of air supplied to the cathode of the fuel cell to an amount of air prior to being reduced at the predetermined operation level, when the measured temperature of the stack of the fuel cell is elevated to a predetermined temperature.

11 Claims, 9 Drawing Sheets

(56) References Cited

FOREIGN PATENT DOCUMENTS

| | | |
|---|---|---|
| KR | 10-2006-0030212 | 4/2006 |
| KR | 1020100102972 | 9/2010 |
| KR | 1020110069472 | 6/2011 |

\* cited by examiner

CONDENSED WATER REMOVING METHOD AND APPARATUS OF GAS DIFFIUSION LAYER AND CATALYST LAYER OF FUEL CELL AND APPARATUS

CROSS-REFERENCE TO RELATED APPLICATION

This application claims under 35 U.S.C. §119(a) the benefit of Korean Patent Application No. 10-2013-0168516 filed on Dec. 31, 2013, the entire contents of which are incorporated herein by reference.

TECHNICAL FIELD

The present invention relates to a method and an apparatus for removing condensed water in a catalyst layer and a gas diffusion layer of a fuel cell. In particular, the method of removing the condensed water in the gas diffusion layer and the catalyst layer of the fuel cell may use a vapor pressure generated by increasing a temperature within a stack as an amount of air supplied to a cathode of the fuel cell is temporarily reduced, and the increased pressure of vapor, oxygen, and nitrogen gas around a catalyst by increasing a temperature of a catalyst layer.

BACKGROUND

Recently, as global interest in an environmentally-friendly and high-efficiency vehicle increases, research and development for a vehicle using a next-generation energy source have been conducted as an essential project. For example, a fuel cell using hydrogen gas as energy source has received great attention as a non-polluting vehicle.

In current vehicle industry, various types of fuel cells have been developed. However, since such fuel cells for a vehicle may be required to have high efficiency, output concentration, short starting time, rapid response characteristics depending on a change in load, and the like, study has been focused on commercialization of a fuel cell vehicle where a polymer electrolyte member fuel cell may be applied.

In the fuel cell, hydrogen reacts with oxygen in the air to generate electric energy and generate water as a by-product. Further, in the fuel cell, the water needs to be discharged to a channel from a cathode catalyst layer via a gas diffusion layer (GDL) and the oxygen needs to be sufficiently supplied from the channel to the catalyst layer via the gas diffusion layer. In addition, the fuel cell should be operated at an optimal temperature of about 60° C. to 80° C.

When the temperature is less than the optimal temperature, the water may be condensed inside the catalyst layer and the gas diffusion layer or the water may be condensed or flooded in the channel and thus block the supplied oxygen, thereby reducing the performance of the fuel cell. When the temperature is greater than the optimal temperature, the water inside the membrane may dry up, thereby reducing the performance of the fuel cell.

As such, it is critical to maintain the optimal temperature of fuel cell operation.

The fuel cell vehicle may require greater time to be preheated when a vehicle starts at room temperature. When the fuel cell vehicle is rapidly accelerated without sufficient preheating, a large amount of water may be generated. As consequence, the water may be condensed inside the catalyst layer and the gas diffusion layer or the water may be condensed or flooded in the channel, which may cause blocking the oxygen supplied to the catalyst in a cathode of the fuel cell.

Therefore, the fuel cell vehicle in the related art may limit output of the fuel cell before the fuel cell is sufficiently preheated to control an appropriate amount of water to be discharged through the channel. However, the condensed water may not be easily discharged to the outside.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention may provide technical solutions to the technical difficulties in the related arts. Accordingly, in a preferred aspect, the present invention provides an apparatus a method of removing condensed water in a gas diffusion layer and a catalyst layer of a fuel cell particularly by vaporizing water condensed in the catalyst layer and the gas diffusion layer inside the fuel cell and forcibly discharging vapor to a channel, thereby improving performance of the fuel cell.

In one aspect, the present invention provides a method of removing condensed water in a gas diffusion layer and a catalyst layer of a fuel cell.

In an exemplary embodiment, the method may include steps of: determining whether the condensed water is generated in the gas diffusion layer and the catalyst layer of the fuel cell; reducing an amount of air supplied to a cathode of the fuel cell by a predetermined amount, when it is determined that the condensed water is generated in the gas diffusion layer and the catalyst layer; measuring a temperature of a stack of the fuel cell; and increasing the amount of air supplied to the cathode of the fuel cell to an initial amount of air supplied to the cathode by the predetermined amount when the temperature of the stack of the fuel cell is elevated to a predetermined vaporizing temperature or greater.

In an exemplary embodiment, the method of removing condensed water in the gas diffusion layer and the catalyst layer the fuel cell may include steps of: determining whether the condensed water is generated in the gas diffusion layer and the catalyst layer of the fuel cell; reducing an amount of air supplied to a cathode of the fuel cell by a predetermined amount when it is determined that the condensed water is generated in the gas diffusion layer and the catalyst layer; supplying the reduced amount of air to the cathode of the fuel cell for a predetermined time; and increasing the amount of air supplied to the cathode of the fuel cell by the predetermined amount to an initial amount of air supplied to the cathode after the predetermined time elapses.

In the step of determining whether the condensed water is generated in the gas diffusion layer and the catalyst layer of the fuel cell, a state may be determined based on whether a difference between an output value of the fuel cell and an output value at a normal state is greater than a predetermined difference value.

In the step of measuring of the temperature of the stack of the fuel cell, the measured may be a temperature of cooling water supplied to the fuel cell or a temperature of air supplied to the cathode of the fuel cell.

In an exemplary embodiment, the method may further include a step of determining whether preheating of the fuel cell is completed before determining whether the condensed water is generated in the gas diffusion layer and the catalyst layer of the fuel cell.

In another aspect, the present invention provides an apparatus for removing condensed water in a gas diffusion layer and a catalyst layer of a fuel cell.

In an exemplary embodiment, the apparatus may include: a determining unit which determines whether the condenses water is generated in the gas diffusion layer and the catalyst layer of the fuel cell; a temperature sensor unit which measures a temperature of the fuel cell; and a control unit which controls an amount of air supplied to a cathode of the fuel cell based on a value measured by the temperature sensor unit and a value determined by the determining unit.

In the determining unit, a state may be determined whether the condensed water is generated based on whether a difference between an output value of the fuel cell and an output value at a normal state is greater than a predetermined difference value.

In the temperature sensor unit, the measured temperature of the fuel cell from a stack of the fuel cell may be a temperature of cooling water supplied to the fuel cell or a temperature of the air supplied to the cathode of the fuel cell.

The control unit may reduce the amount of air supplied to the cathode of the fuel cell by a predetermined amount and supply the reduced amount of air to the fuel cell when it is determined that condensed water is generated by the determining unit. The control unit may further increase the amount of air supplied to the fuel cell by the predetermined amount to an initial amount of air to the fuel cell when the temperature of the fuel cell measured by the temperature sensor unit is increased to the predetermined vaporizing temperature or greater.

Alternatively, the control unit may reduce the amount of air supplied to the cathode of the fuel cell by a predetermined amount when it is determined that the condensed water is generated by the determining unit and supply the reduced amount of air for a predetermined time. The control unit may increase the amount of air supplied to the cathode of the fuel cell by the predetermined amount to the initial amount of air after the reduced air is supplied for the predetermined time.

As such, the method and apparatus of various embodiments of the present invention provides advantages. For example, water generated around the catalyst layer of the fuel cell and in the gas diffusion layer may be easily removed. In addition, the water generated in the gas diffusion layer may be removed without changing the structure of the fuel cell. Moreover, the power generation efficiency in the large area stack may increase, since the air concentration at the outlet side of the cathode is less than that of the inlet side thereof and the greater voltage drop is generated.

Other aspects and preferred embodiments of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
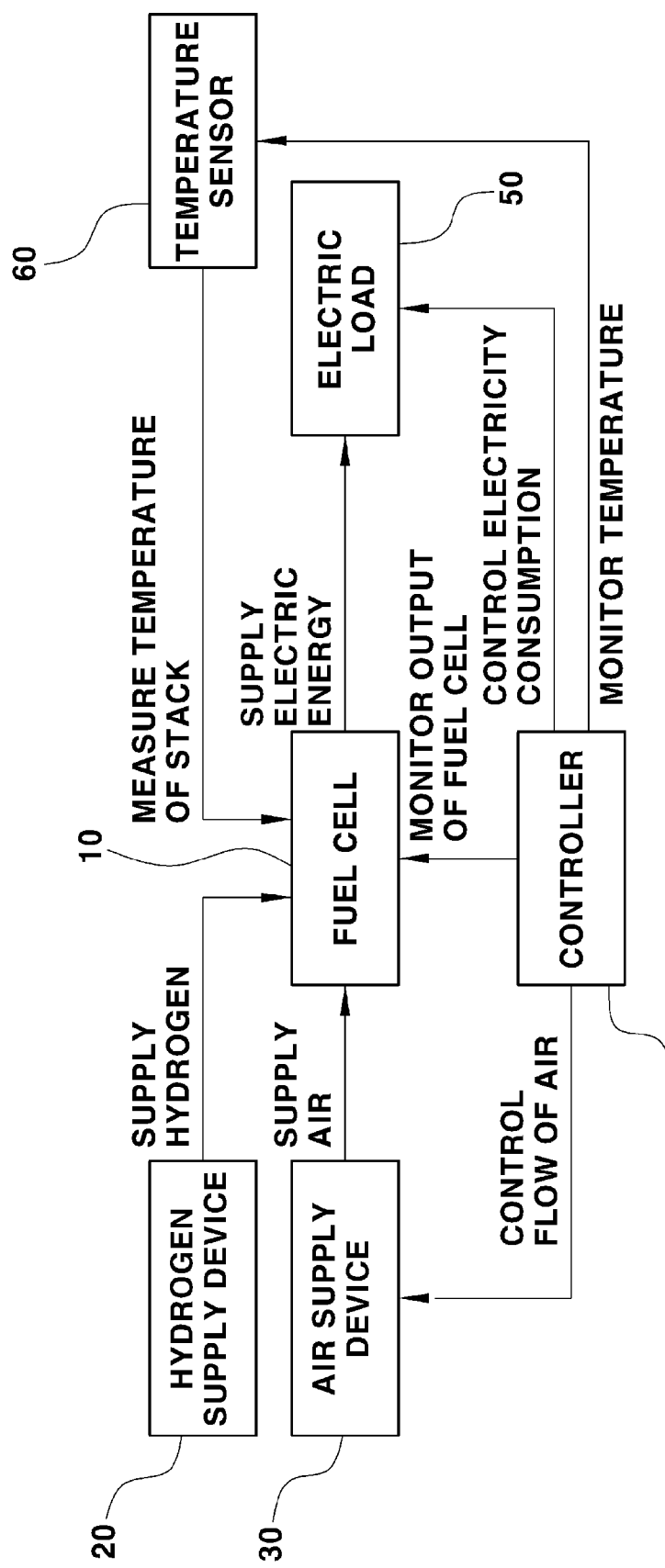
FIG. 1 schematically illustrating an exemplary apparatus for removing condensed water of a gas diffusion layer and a catalyst layer of a fuel cell according to an exemplary embodiment of the present invention.

Reference numerals set forth in the Drawings includes reference to the following elements as further discussed below:

| | |
|---|---|
| 10: fuel cell | 20: hydrogen supply device |
| 30: air supply device | 40: controller |
| 50: electric load | 60: temperature sensor |
| 70: cooling water | |

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The term "predetermined temperature" as used herein refers to a temperature at which the fuel cell 10 may normally operate.

The term "predetermined vaporizing temperature" refers to a temperature sufficient to vaporize the condensed water in the fuel cell.

Hereinafter reference will now be made in detail to various exemplary embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 schematically illustrates a configuration of an exemplary apparatus for removing condensed water in a gas diffusion layer and a catalyst layer of a fuel cell according to an exemplary embodiment of the present invention.

The condensed water removing apparatus of a gas diffusion layer and a catalyst layer of a fuel cell according to an exemplary embodiment of the present invention may include a fuel cell 10, an air supply device 30, a hydrogen supply device 20, a controller 40, an electric load 50, and a temperature sensor 60.

The fuel cell 10 is a power generation apparatus supplied with hydrogen and air to generate electricity and may include an air supply channel, a gas diffusion layer, a catalyst layer, a membrane, and the like. The air supply device 30 supplying air to the fuel cell 10 may be, but not limited to, an air blower, a compressed air control valve, and the like. In particular, the air supply device may receive a command of the controller 40 to control an amount of air supplied to the fuel cell 10.

The hydrogen supply device 20 supplying hydrogen to the fuel cell 10 may include a hydrogen tank, a valve, an ejector, a blower, and the like.

The electric load 50 consuming electricity generated from the fuel cell, may be, but not limited to, a motor, auxiliary machinery, and the like and the temperature sensor 60 may measure the temperature of the fuel cell.

The controller 40 may be a device which may control an air flow of the air supply device 30 and control a power generation amount of the fuel cell and electricity consumption of the electric load. The controller 20 may be an upper controller inside the vehicle or an integrated controller of the upper controller with an inverter for the air supply device.

Figure 2:
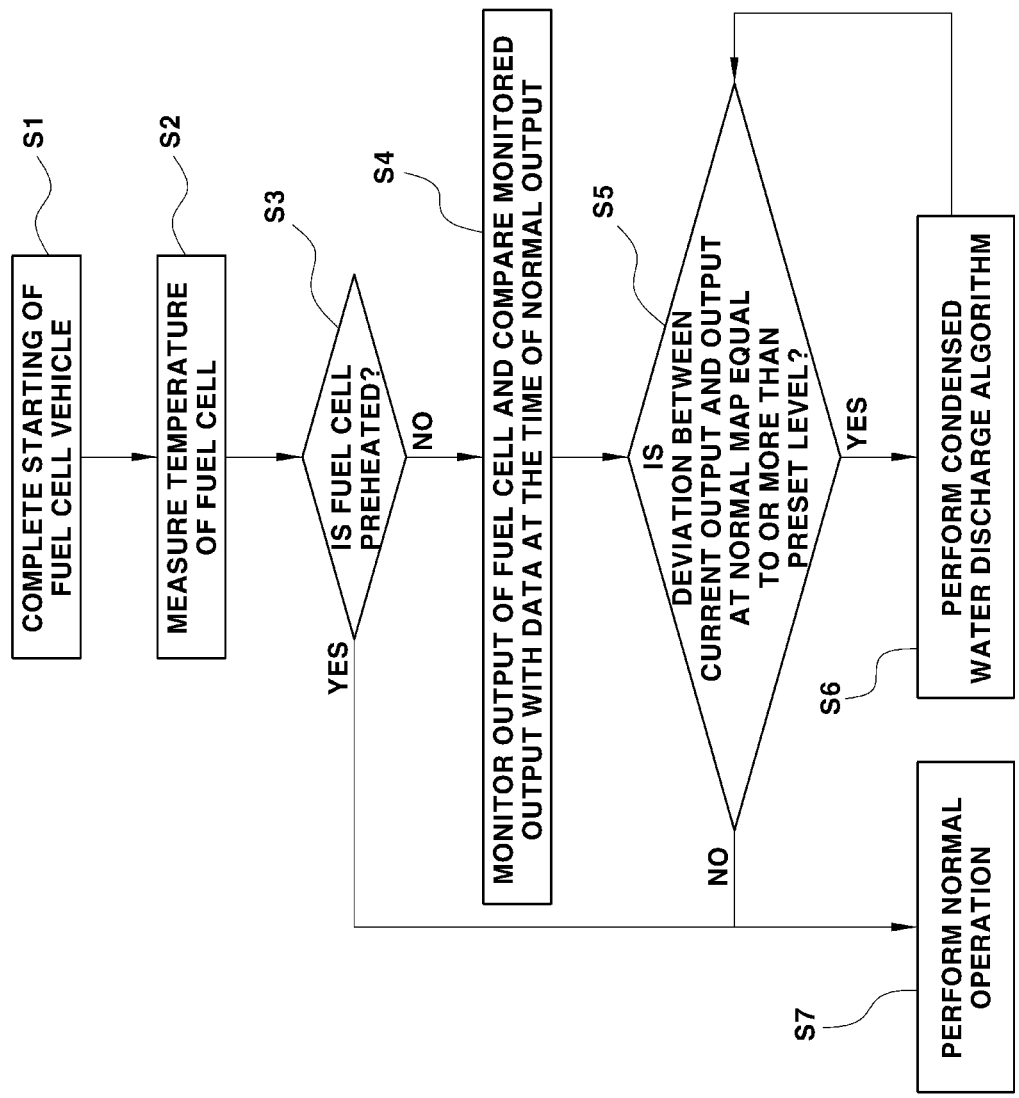
FIG. 2 illustrates an exemplary operation process of an exemplary method of removing condensed water removing in a gas diffusion layer and a catalyst layer of a fuel cell according to an exemplary embodiment of the present invention.

FIG. 2 illustrates an example of an operation process of an exemplary method of removing condensed water in a gas diffusion layer and a catalyst layer of a fuel cell according to an exemplary embodiment of the present invention.

In FIG. 1, the method of removing condensed water in a gas diffusion layer and a catalyst layer of a fuel cell may start from a process of confirming whether the fuel cell vehicle starts (S1).

After the vehicle starts, the method may include a process of measuring a temperature of the fuel cell 10 (S2).

Subsequently, the method may include a process of determining whether a preheating of the fuel cell is completed by comparing the temperature of the fuel cell 10 with a predetermined temperature (S3). In particular, as used herein, "predetermined temperature" may be a temperature at which the fuel cell 10 may normally operate, and may be determined as an appropriate value depending on specifications of the vehicle in which the fuel cell 10 is equipped.

When the preheating of the fuel cell 10 is completed or when it is considered that condensed water is not generated inside the fuel cell, a process of normally driving a vehicle may be performed (S7).

However, when the preheating of the fuel cell 100 is not completed, the method may include performing a process of monitoring an output of the fuel cell and comparing the monitored output with data of a normal output (S4). In particular, the data of the normal output may be obtained in advance by repeated experiments and the data of the normal output may be stored in a storage space, such as in a map type in advance.

When a deviation between a current output of the fuel cell and the output at the normal map is determined to be less than a predetermined difference value, it may be determined that the fuel cell is normally operating.

However, when the current output of the fuel cell is compared with the output at the normal map and it is determined that the deviation is equal to or greater than a predetermined difference value (S5), a condensed water discharge algorithm according to an exemplary embodiment of the present invention may be performed (S6).

The condensed water discharge algorithm of the method according to an exemplary embodiment of the present invention may be achieved by reducing the amount of air supplied from the air supply device 30 to the fuel cell 10 for a predetermined time. As used herein, "stoichiometry ratio (SR)" may refer to an amount of air, and the reducing the amount of air may also be referred as reducing a stoichiometry ratio (SR) of air supplied to the fuel cell. As such, the condensed water generated in the fuel cell 10 may be removed by reducing the SR of air supplied to the cathode of the fuel cell 10 for the predetermined time and then increasing the SR to an ignition SR.

Figure 3:
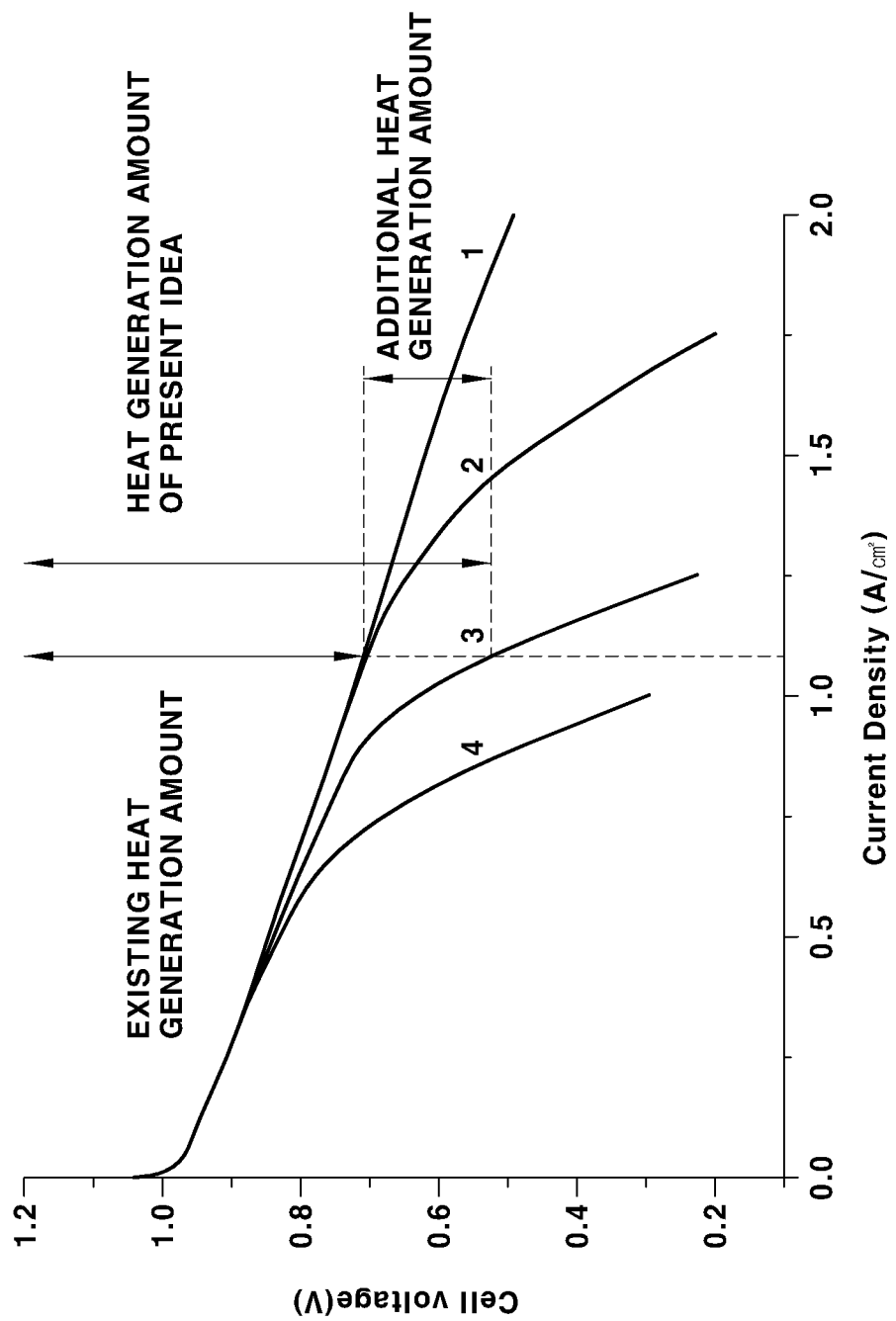
FIG. 3 is an exemplary graph showing an exemplary principle to remove condensed water in a gas diffusion layer and a catalyst layer of a fuel cell according to an exemplary embodiment of the present invention.
Figure 4:
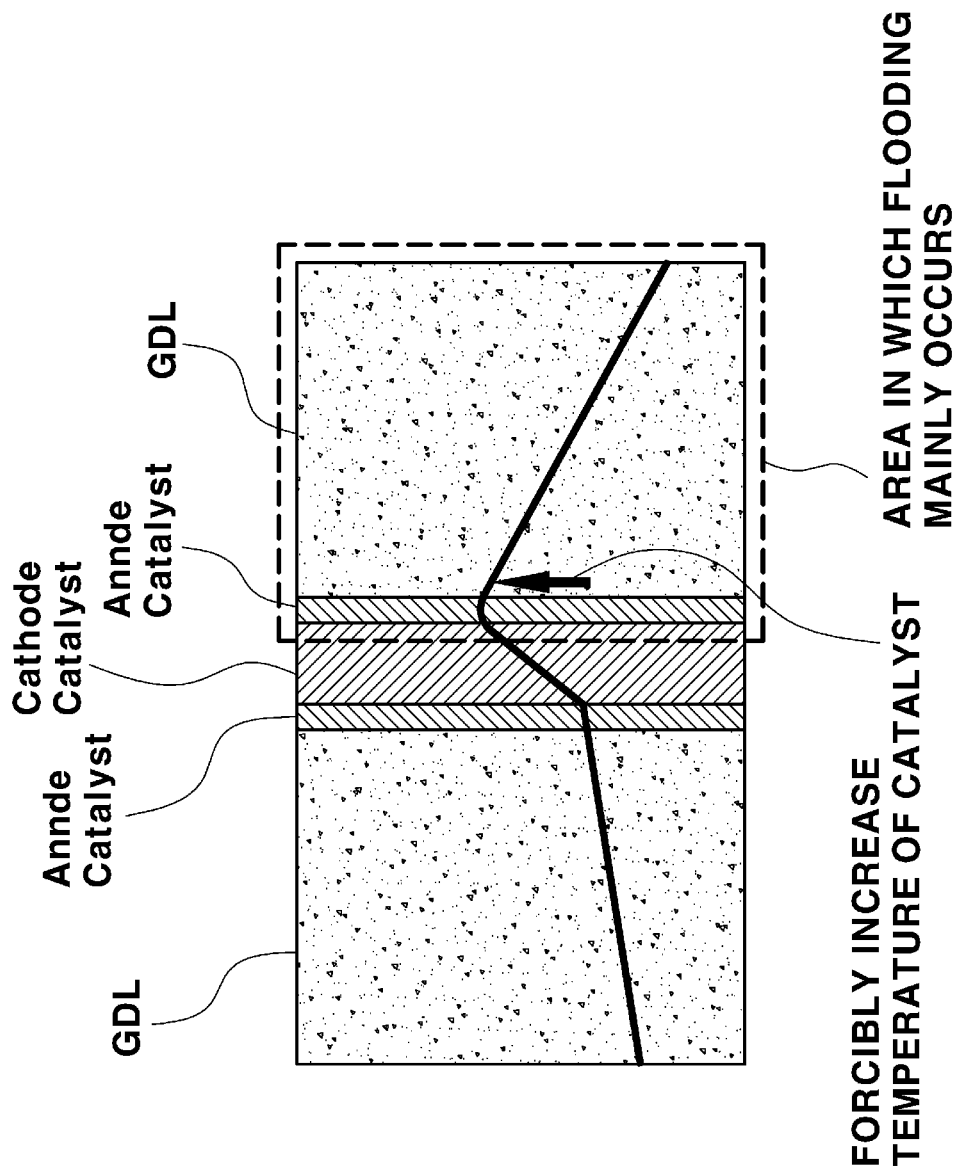
FIG. 4 illustrates an exemplary temperature distribution model within the fuel cell where the condensed water is generated and removed by an exemplary method according to the exemplary embodiment of the present invention.
Figure 5:
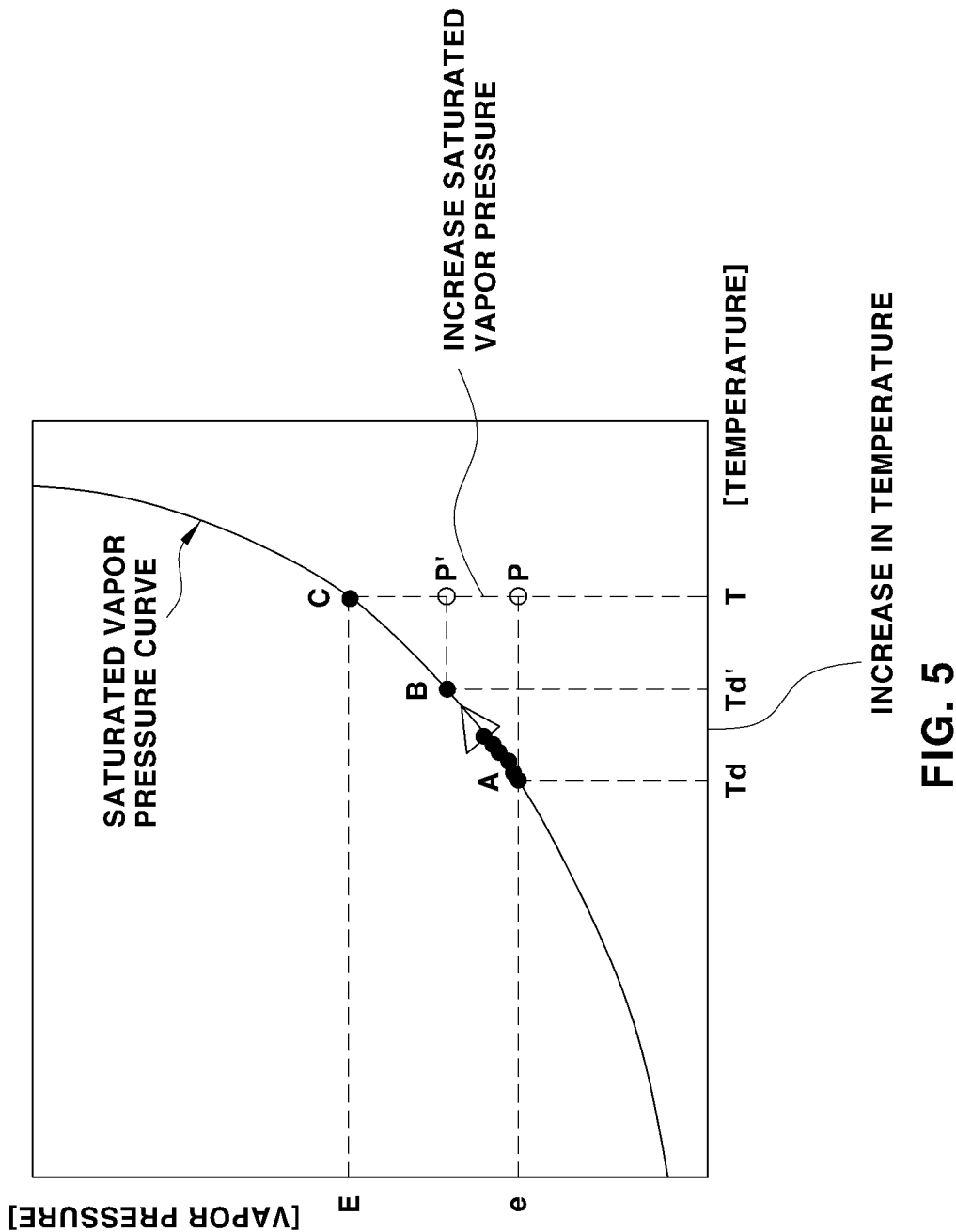
FIG. 5 is an exemplary graph showing an exemplary principle of removing condensed water in a gas diffusion layer and a catalyst layer of a fuel cell according to an exemplary embodiment of the present invention, and the graph illustrates that saturated water vapor pressure may increase as temperature increases.

FIGS. 3 to 5 show exemplary graphs showing principles of removing condensed water according to an exemplary embodiment of the present invention.

As shown in FIG. 3, when the amount of air supplied to the fuel cell is reduced, the fuel cell may not receive air in a high output area and thus a voltage of the fuel cell may be reduced at the same output.

When the voltage is reduced, a greater amount of heat than 'existing heat generation amount' may be generated in the stack. Such heat energy may be referred as 'heat generation amount of the present idea' and as shown in from FIG. 3, as compared with the 'existing heat generation amount', heat corresponding to the 'additional heat generation amount' may be further generated.

The 'additional heat generation amount' may increase the temperature of the catalyst of the cathode of the fuel cell 10 to vaporize a portion of the condensed water around the catalyst layer.

Therefore, the condensed water of the catalyst layer and the gas diffusion layer may be discharged to the channel side as vapor with a vapor pressure.

FIG. 4 is an exemplary graph of a temperature distribution within the fuel cell where the method of removing condensed water may be applied according to an exemplary embodiment of the present invention.

In particular, as shown in FIG. 4, the amount of air supplied to the cathode may be reduced and the temperature of the catalyst layer may be forcibly elevated.

FIG. 5 illustrates an exemplary principle and illustrates that the saturated vapor pressure may increase as the temperature increases.

Figure 6:
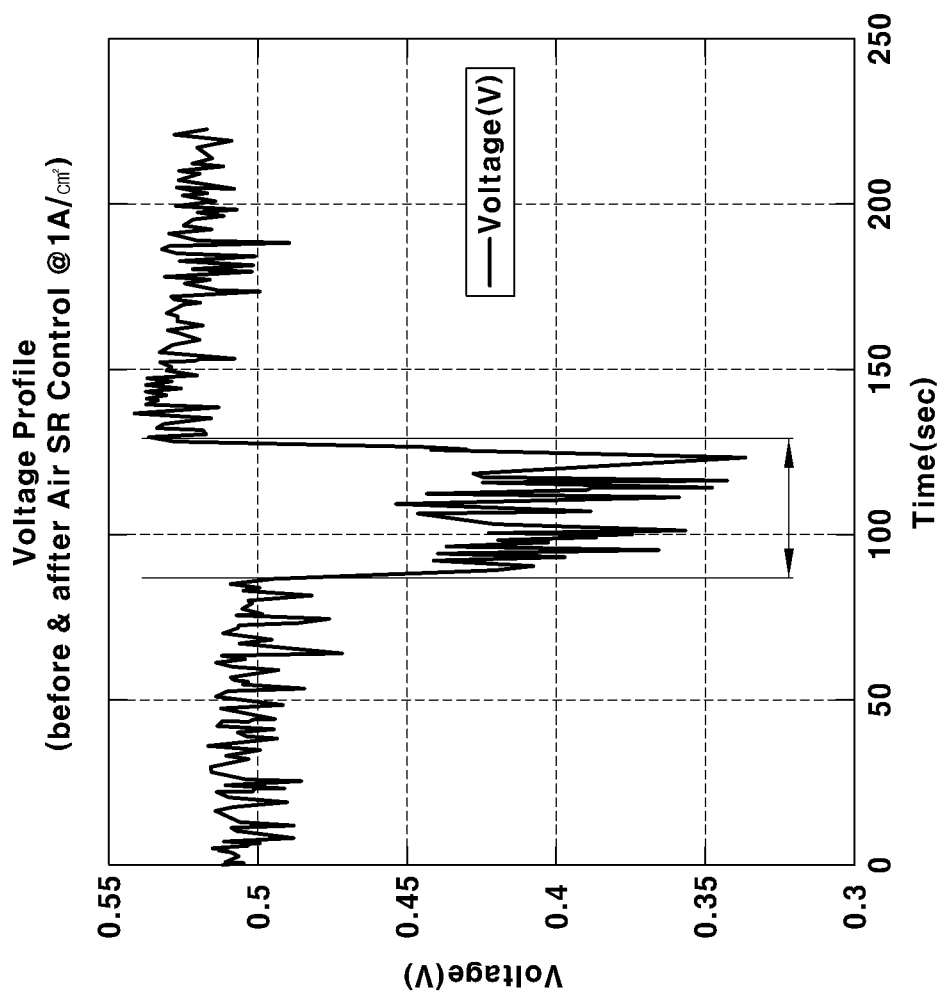
FIG. 6 is an exemplary graph showing an effect of removing condensed water in a gas diffusion layer and a catalyst layer of a fuel cell according to an exemplary method according to an exemplary embodiment of the present invention.

FIG. 6 is a graph showing an exemplary effect of the method according to an exemplary embodiment of the present invention. In particular, the air supplied by the air supply device 30 may be reduced to temporarily reduce the amount of electricity generated from the fuel cell 10 and then increase the amount of electricity again.

Figure 7:
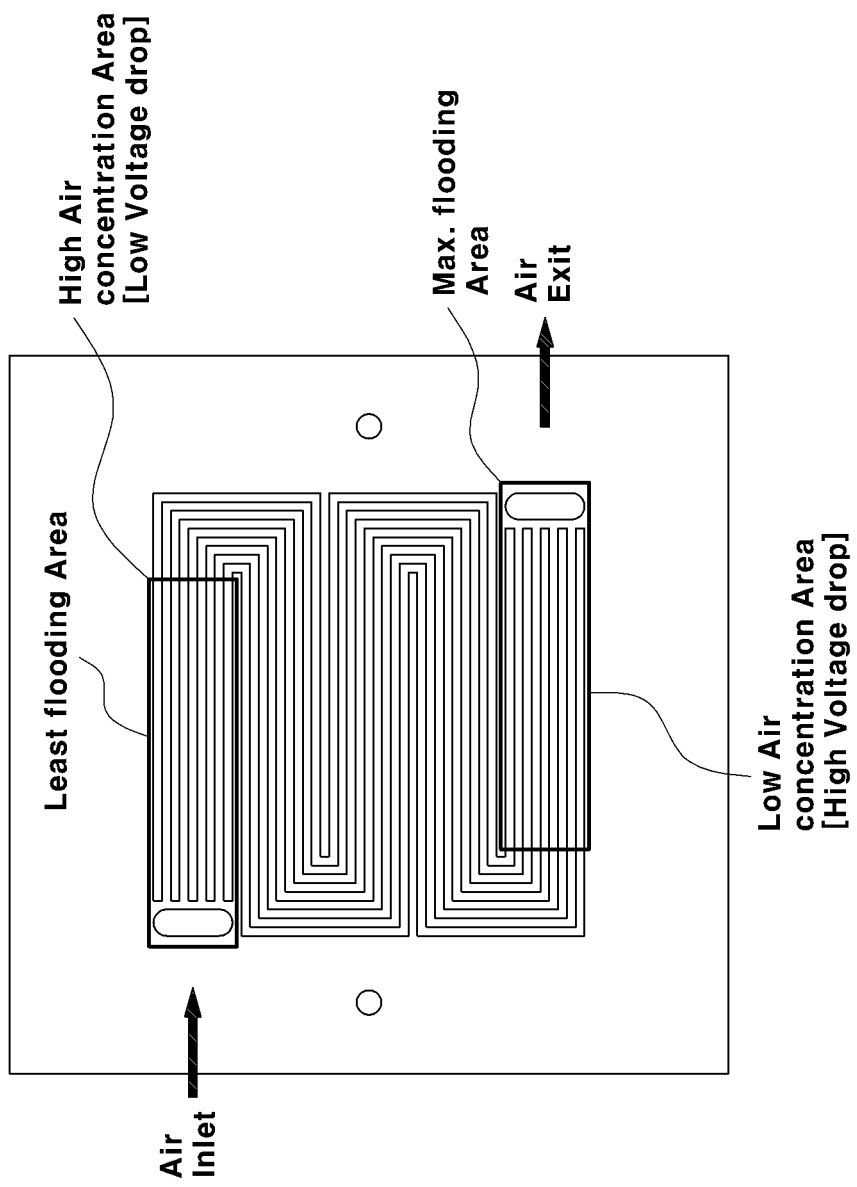
FIG. 7 illustrates an exemplary cathode passage of the gas diffusion layer of a large area stack where an exemplary method of removing condensed water in the gas diffusion layer and the catalyst layer of a fuel cell is applied according to an exemplary embodiment of the present invention.

FIG. 7 illustrates an exemplary cathode passage of an exemplary gas diffusion layer of a large area stack to which the method of removing condensed water in the gas diffusion layer and the catalyst layer of the fuel cell according to an exemplary embodiment of the present invention may be applied.

When the method of removing the condensed water in the a gas diffusion layer and a catalyst layer of a fuel cell is applied to the large area stack, the air concentration at the outlet side of the cathode may be less than that of the inlet side of the cathode.

Therefore, the condensed water may be removed by generating greater heat and therefore the condensed water may be more sufficiently vaporized and removed in the large area stack.

Figure 8:
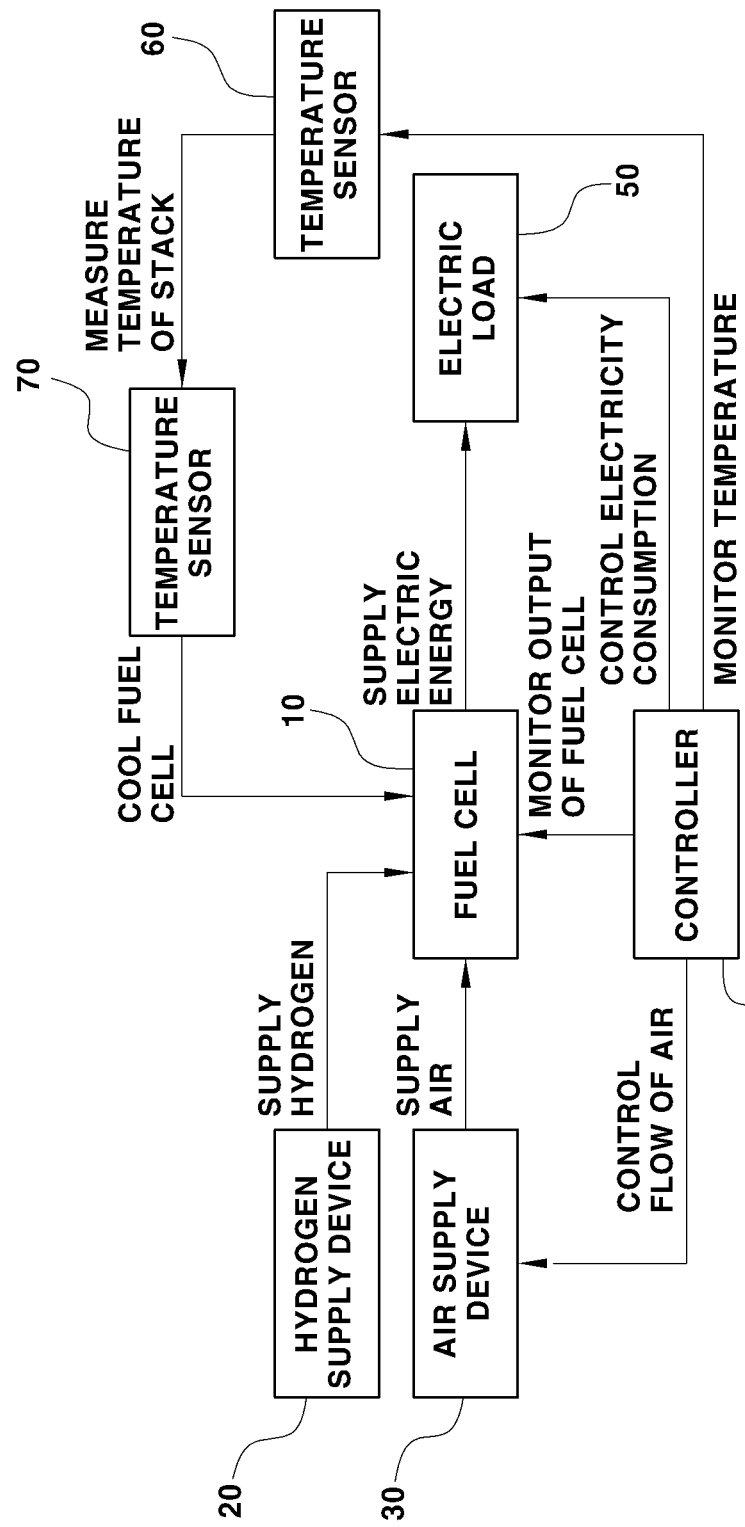
FIG. 8 illustrates an exemplary method of removing condensed water in a gas diffusion layer and a catalyst layer of a fuel cell according to an exemplary embodiment of the present invention.
Figure 9:
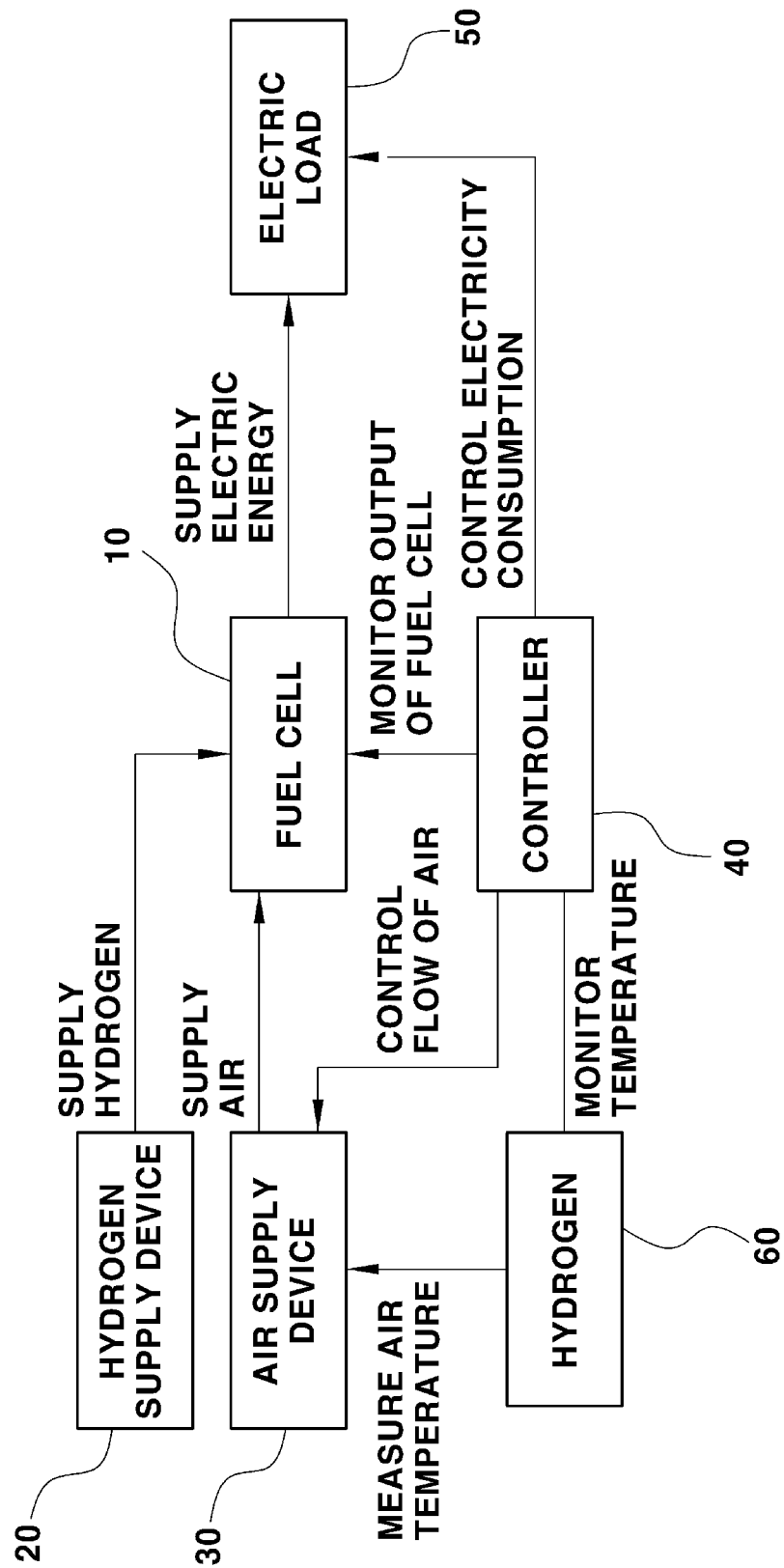
FIG. 9 illustrates an exemplary method of removing condensed water in a gas diffusion layer and a catalyst layer of a fuel cell according to still an exemplary embodiment of the present invention.

FIGS. 8 and 9 are diagrams illustrating a condensed water removing method of a gas diffusion layer and a catalyst layer of a fuel cell according to an exemplary embodiment of the present invention.

In FIG. 8, the controller 40 may measure a temperature of cooling water 70 serving to cool the fuel cell 10 using the temperature sensor 60 so as to control the amount of air supplied to the cathode of the fuel cell 10.

However, as illustrated in FIG. 9, the temperature of air supplied from the air supply device 30 may be measured using the temperature sensor 60 and the controller 40 may receive the measured value, thereby determining whether the preheating of the fuel cell 10 is completed.

In various exemplary embodiments of the present invention, the method of removing condensed water in a gas diffusion layer and a catalyst layer of a fuel cell may be reducing the SR of air supplied to the cathode for a predetermined time and then increasing the SR. The method may also determine whether the condensed water of the catalyst layer and the gas diffusion layer is removed by measuring the temperature of the fuel cell 10. When it is determined that the condensed water is generated in the fuel cell, the amount of air supplied to the cathode may be reduced and thus the temperature of the fuel cell 10 may increase and the condensed water in the fuel cell may be removed by measuring whether the temperature of the fuel cell 10 is elevated to a predetermined vaporizing temperature or greater which is a temperature sufficient to vaporize the condensed water in the fuel cell. Further, a process may be also performed to sufficiently increasing the temperature of the fuel cell 10 to remove the condensed water and then increasing the amount of air to the initially supplied amount of the air.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of removing condensed water removing in a gas diffusion layer and a catalyst layer of a fuel cell, comprising:
    determining a state of the fuel cell whether the condensed water is generated in the gas diffusion layer and the catalyst layer of the fuel cell;
    reducing an amount of air supplied to a cathode of the fuel cell by a predetermined amount when it is determined that the condensed water is generated in the gas diffusion layer and the catalyst layer;
    wherein reducing an amount of air increases a temperature of the catalyst layer;
    vaporizing a portion of the condensed water around the catalyst layer by increasing the temperature of the catalyst of the cathode of the fuel cell;
    discharging the condensed water of the catalyst layer and the gas diffusion layer to a channel side by increasing a water vapor pressure of the catalyst layer and the gas diffusion layer;
    measuring a temperature of a stack of the fuel cell; and
    increasing the amount of air supplied to the cathode of the fuel cell by the predetermined amount to an initial amount of air supplied to the cathode of the fuel cell when the measured temperature of the stack of the fuel cell is elevated to a predetermined vaporizing temperature or greater.

2. The method of claim 1, wherein in the determining whether the condensed water is generated in the gas diffusion layer and the catalyst layer of the fuel cell, when a difference between an output value of the fuel cell and an output value at a normal state is greater than a predetermined difference value, it is determined that the condensed water is generated.

3. The method of claim 1, wherein in the measuring of the temperature of the stack of the fuel cell, the temperature is a temperature of cooling water supplied to the fuel cell or a temperature of air supplied to the cathode of the fuel cell.

4. The method of claim 1, further comprising:
    determining whether preheating of the fuel cell is completed prior to the determining whether the condensed water is generated in the gas diffusion layer and the catalyst layer of the fuel cell.

5. A method of removing condensed water in a gas diffusion layer and a catalyst layer of a fuel cell, comprising:

determining whether the condensed water is generated in the gas diffusion layer and the catalyst layer of the fuel cell;

reducing an amount of air supplied to a cathode of the fuel cell by a predetermined amount when it is determined that the condensed water is generated in the gas diffusion layer and the catalyst layer;

wherein reducing an amount of air increases a temperature of the catalyst layer, supplying the reduced amount of air by the predetermined amount for a predetermined time;

vaporizing a portion of the condensed water around the catalyst layer by increasing the temperature of the catalyst of the cathode of the fuel cell;

discharging the condensed water of the catalyst layer and the gas diffusion layer to a channel side by increasing a water vapor pressure of the catalyst layer and the gas diffusion layer; and increasing the amount of air supplied to the cathode of the fuel cell by the predetermined amount to an initial amount of air after the predetermined time passes.

6. The method of claim 5, wherein in the step determining whether the condensed water is generated in the gas diffusion layer and the catalyst layer of the fuel cell, when a difference between an output value of the fuel cell and a predetermined output value at a normal state is greater than a predetermined difference value, it is determined that the condensed water is generated.

7. An apparatus for removing condensed water in a gas diffusion layer and a catalyst layer of a fuel cell, comprising:
   a determining unit which determines whether the condenses water is generated in the gas diffusion layer and the catalyst layer of the fuel cell;
   a temperature sensor unit which measures a temperature of the fuel cell; and
   a control unit programmed to reduce an amount of air supplied to a cathode of the fuel cell based on the measured temperature by the temperature sensor unit and a value determined by the determining unit,
   wherein reducing an amount of air increases a temperature of the catalyst layer;
   wherein a portion of the condensed water around the catalyst layer is vaporized by increasing the temperature of the catalyst of the cathode of the fuel cell, and
   wherein the condensed water of the catalyst layer and the gas diffusion layer is discharged to a channel side by increasing a water vapor pressure of the catalyst layer and the gas diffusion layer.

8. The apparatus of claim 7, wherein the determining unit determines whether the condensed water is generated based on a difference between an output value of the fuel cell and a predetermined output value at a normal state, wherein when the difference is greater than a predetermined difference value, it is determined that the condensed water is generated.

9. The apparatus of claim 7, wherein the temperature sensor unit measures the temperature of the fuel cell from a stack of the fuel cell, the temperature of cooling water supplied to the fuel cell, or the temperature of the air supplied to the cathode of the fuel cell.

10. The apparatus of claim 7, wherein the control unit is programmed to reduce the amount of air supplied to the cathode of the fuel cell by the predetermined amount when it is determined that the condensed water is generated by the determining unit; and increases the amount of air supplied to the fuel cell by the predetermined amount to an initial amount when the measured temperature of the fuel cell by the temperature sensor unit is elevated to the predetermined vaporizing temperature or greater.

11. The apparatus of claim 7, wherein the control unit is programmed to reduce the amount of air supplied to the cathode of the fuel cell by the predetermined amount when it is determined by the determining unit that the condensed water is generated and increases the amount of air supplied to the cathode of the fuel cell by the predetermined amount to the initial amount of air after the air is supplied for the predetermined time.

* * * * *